Feb. 17, 1931.   J. E. STOUT   1,792,876
RESILIENT SUPPORT FOR VEHICLES
Filed Sept. 29, 1928
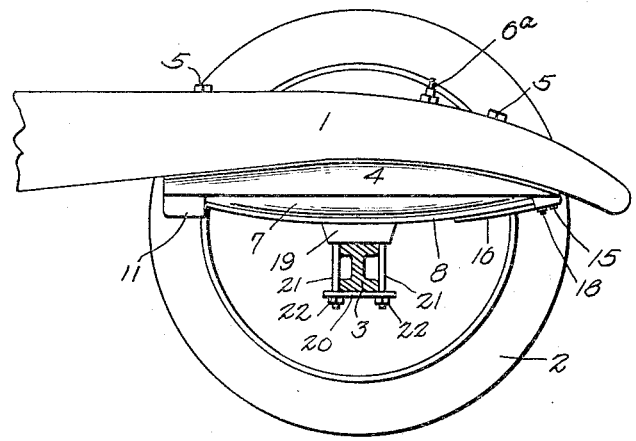
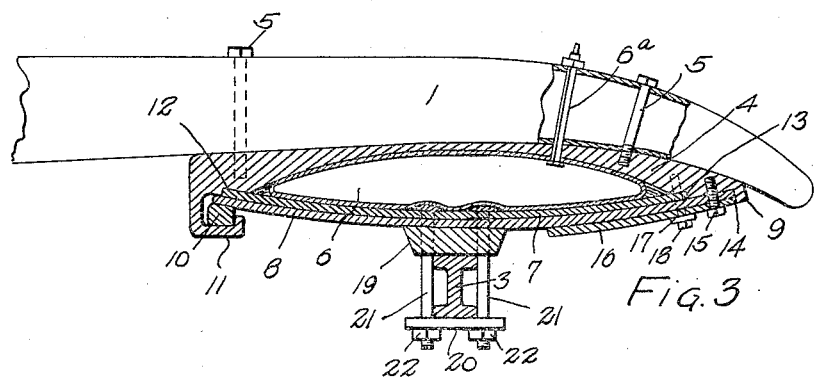
INVENTOR.
JAMES E. STOUT.
BY
*E. H. Bond*
ATTORNEY.

Patented Feb. 17, 1931

1,792,876

UNITED STATES PATENT OFFICE

JAMES E. STOUT, OF MOUNT DORA, FLORIDA

RESILIENT SUPPORT FOR VEHICLES

Application filed September 29, 1928. Serial No. 309,295.

This invention relates to certain new and useful improvements in resilient supports for vehicles, and it has for its objects, among others, to provide an air cushion support for the vehicle between the frame and the axle of the vehicle, embodying a substantially flat spring to steady or guide the axle in its movements, but so fastened as to eliminate shackle bolts and bushings, said spring being so positioned as to act, or react, against the rebound resulting from an upward thrust of the axle which, through the action of the air cushion, swings the body of the vehicle.

The advantages of my construction may be summed up as follows; a perfectly resilient air cushion between the axle and the frame of the vehicle to absorb thrusts occurring from irregularities of roads, absorption of rebound by means of the spring which builds up tensioning as the swing of the vehicle is increased, and at the same time dispensing with the necessity of the employment of shackle bolts and bushings, which have heretofore been necessary, and which require constant lubrication.

I also obtain simplicity of construction, permitting universal adoption in production of automobiles at practically the same cost as by present methods, the construction and arrangement of parts being simple, rigid and dependable I employ a relatively broad spring ply with auxiliary ply beneath the same bolted, or otherwise secured to the dome casting at one end and lying underneath a diaphragm extending through the opposite side of the dome which may be of varying shapes, the said spring being supported against the diaphragm at one end by means of a rubber shackle block, the axle of the vehicle being fastened across said spring at about its mid length.

The air cushion is disposed between the frame of the vehicle and the axle, in contradistinction to being disposed between the axle and the spring of the vehicle, as heretofore. The dome is rigidly affixed to the underside of the frame, and the spring above the axle is affixed to the latter. The resiliency, therefore, is between the frame and the axle and thus the air cushion and its appurtenances form the resilient support for the vehicle body.

By my construction there is less liability of damage to parts in going over rough and uneven roads and the riding is made much easier.

Other objects and advantages of the invention will hereinafter appear, and the novel features thereof will be specifically defined by the appended claims.

The invention, in its preferred form, is clearly illustrated in the accompanying drawings, which, with the numerals of reference marked thereon, form a part of this specification, and in which Figure 1 is a view, partly in elevation and partly in vertical cross section of a portion of a vehicle equipped with my present improvement.

Figure 2 is a bottom plan.

Figure 3 is a view with the frame member in side elevation, the remainder of the figure being in vertical section.

Like numerals of reference indicate like parts throughout the several views.

Referring to the drawings 1 designates a portion of the frame of the vehicle, seen in side elevation, 2 is the wheel, and 3 the axle, which may be of any of the well known or approved forms of construction.

Secured to the under side of the frame member 1, near its end, is a dome 4, preferably of metal, oval shaped, or, concave upon its under face, as seen in Figure 3, and this dome member is secured in any suitable manner, as by bolts 5, see Figure 3.

Disposed within the dome member is a rubber fabricated, or analogous diaphragm 6, in the form of a tubular element, which is provided with suitable means, as an inflating tube, of any well known type, as seen at 6ª, see Figure 3, into which air is adapted to be introduced in the same manner as a tire is inflated.

The diaphragm 6 is supported upon an under diaphragm 7 of fabricated rubber or the like, which forms a support for the inflatable member 6, as seen in Figure 3, and this member 7 bolted or otherwise secured around its edge in a recess in the member 4 rests upon a spring member 8, one end of which is engaged against a shoulder 9 on the adjacent end of the dome as seen in Figure 3, the other end of this member 8 resting upon a yielding, generally rubber, shackle block 10, which, in turn is supported on the inwardly-extending lug or portion 11 of the adjacent end of the dome member 4, as will be clearly understood upon reference to Figure 3. The member 7 at this end as well as completely around its edge is engaged in a recess or the like 12 in the under side of the dome member and at the other end is disposed in a similar recess or the like 13 in the adjacent end of the under side of the down member; this serves to prevent endwise displacement of the diaphragm 7 under compression.

The one end of the spring member 8 engages a shoulder 14 on a depending end portion or shoulder 9 of the dome, while the other end of this member 8 rests upon the shackle block 10. This end of the spring member 8 is secured to the dome member by suitable means, as the bolt 15, the other end being free and unattached as will be evident from Figure 3.

16 is a short spring ply disposed against the under side of the spring member 8 at the same end which is secured by the bolt 15; this spring is secured by the bolt 15 and further by means of a clamp or cross member 17 underlying the said end and secured to the dome member 4 by bolts or the like 18. The other end of this spring member 16 is free and unattached, the spring being of short length and upon which the spring member 8 rests as seen best in Figure 3.

Resting upon the upper face of the axle is a block 19, and 20 are plates that extend beneath the axle tranversely of the length thereof, as seen in Figure 2, bolts 21, passing through the member 7 and alongside the spring member 8 and through said plates, serving to hold the parts in proper position. 22 are nuts upon the lower ends of the bolts 21.

The disposition of the air cushion at substantially the mid length of the spring and the axle at substantially the mid length of the latter has been found to give most satisfactory results.

In operation, the air cushion forms a perfectly resilient support between the axle and frame of the vehicle and absorbs thrusts occasioned by irregularities of the roads, and the rebound is absorbed by the spring structure, which builds up tensioning or tension as the swing of the vehicle body is increased.

In some instances I contemplate the connection together of all of the air cushions and automatic equalization under varying road conditions, all of the air cushions being adapted to be inflated by one and the same operation.

In view of my invention and disclosure, variations and modifications to meet individual whim or particular need will doubtless become evident to others skilled in the art, to obtain part or all of the benefits of my invention without copying the structure shown, and I therefore claim all such in so far as they fall within the reasonable spirit and scope of my invention.

What is claimed as new is:—

1. A resilient support for a vehicle embodying a spring member supported upon the axle, and a cushioning element supported above and upon the axle and directly beneath the frame of the vehicle and serving as the main support of the vehicle.

2. The combination with a vehicle frame member, of a resilient cushioning member suspended beneath said member, and a rebound element supported directly upon the axle and upon which said cushioning member rests said cushioning member and rebound element acting in opposition to each other.

3. A vehicle axle, a vehicle frame member, a cushioning member interposed between the axle and said member, and resilient means for steadying and guiding the axle in its movements, said means positioned to act against the rebound resulting from an upward thrust of the axle said cushioning member serving as the main support of the vehicle.

4. In a resilient vehicle support, a member for attachment to the under side of a frame member, said member being receptive of a resilient cushioning device, and a spring upon which the latter is supported, positioned to act against the rebound resulting from an upward thrust of the axle said cushioning device serving as the main support of the vehicle.

5. In a resilient support for a vehicle, a member for attachment directly to the underside of a frame member of the vehicle, a spring member supported at one end only from the first-named member and free for lengthwise movement, and an air cushioning device interposed between the first-named member and the said spring member.

6. A cushioning device for vehicle, attachable to the underside of a frame member of the vehicle, the same embodying a dome-shaped member, a spring supported therefrom, an inflatable member interposed between said spring and dome-shaped member, and means for affixing said spring directly upon the axle said spring being mounted for free longitudinal movement of one end.

7. A resilient support for a vehicle comprising a dome-shaped member, a diaphragm supported thereby, an inflatable member within the dome and upon said diaphragm, and a spring upon which said diaphragm is supported with one end free for longitudinal movement.

8. A resilient supporting means for a vehicle, embodying a dome-shaped member attachable to the under side of a frame member of a vehicle, an inflatable member within the dome of said first-named member, and a spring support for said inflatable member said inflatable member and spring support acting in opposition to each other.

9. A resilient support for a vehicle, the same comprising a dome-shaped member, an inflatable member therein, and a spring support for said inflatable member, the said spring support having freedom of movement in the direction of its length said inflatable member and spring support acting in opposition to each other.

10. A resilient support for a vehicle, embodying a member attachable to the underside of a frame member of the vehicle, a spring member, an inflatable member supported upon the spring member, and a yielding support for one end of said spring member said inflatable member and yielding support acting in opposition to each other.

11. A resilient support for a vehicle, comprised solely of an inflatable member, means for supporting the same from a frame member, and a spring supported directly upon the axle of the vehicle and serving to support the inflatable member and to act against the rebound resulting from an upward thrust of the axle said inflatable member serving as the main support of the vehicle.

In testimony whereof I affix my signature.

JAMES E. STOUT.